United States Patent

(12) United States Patent
Zoller et al.

(10) Patent No.: US 6,836,786 B1
(45) Date of Patent: Dec. 28, 2004

(54) METHOD AND APPARATUS FOR TERMINAL SERVER ADDRESSABILITY VIA URL SPECIFICATION

(75) Inventors: David E. Zoller, Seattle, WA (US); Madan Mohan R. Appiah, Redmond, WA (US); Nadim Y Abdo, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 649 days.

(21) Appl. No.: 09/845,807

(22) Filed: Apr. 30, 2001

(51) Int. Cl.[7] .............................................. G06F 15/16
(52) U.S. Cl. ...................... 709/203; 709/219; 709/230
(58) Field of Search ................................ 709/200–203, 709/217–219, 230, 220, 225, 221, 211; 719/310–320

(56) References Cited

U.S. PATENT DOCUMENTS 6,205,476 B1 * 3/2001 Hayes, Jr. .................... 709/220

OTHER PUBLICATIONS

Farmer,C.,Making the connection:Linking your Lan to your AS/400 makes sense for many reasons, et al., "*Infoworld*", 1996, pp 61–71.
Battey,J. "The Web Hotlist", *Infoworld*, 1996, p. 41.
Bielefeld, A. et al., "Using the web with legacy databases" *Byte*, 1997, vol. 22(7), pp 41–45.

English, J. et al., "Expanding library horizons through use of the internet:Growth of the internet, past and future" *Computers in Libraries*, 1995, vol. 15(8), pp 41–45.
O'Neill, L. "Test Center Comparasion: Thin–client solutions; NCs take one step forward" *Infoworld*, 1998, pp 48–57.
Young, T. "Test Center Comparasion; Host to browser connectivity; Sharing the legacy, et al., "*Infoworld*, 1998, pp 66–79.
Piquet, L. "Web to host solutions; Acheiving terminal bliss", *Infoworld*, 2000, pp 37–48.
Udell, J. "The Byte Network Project; Server Management" *Byte*, 1996, vol. 21(1), pp 107–110.

* cited by examiner

*Primary Examiner*—St. John Courtenay, III
(74) *Attorney, Agent, or Firm*—Woodcock Washburn LLP

(57) ABSTRACT

A user at a client may specify a URL including certain parameters necessary to establish a corresponding terminal server connection. A corresponding http request generated by Internet Explorers® is sent to a web server, which in response generates the complete set of parameters required for a terminal server connection using ASP script. The parameters, including terminal server name, terminal server application, log-on user name, log on user-password and screen size are returned within the structure of a URL address. The URL returned corresponds to a web page having embedded ActiveX® controls used to facilitate the desired terminal server connection. Terminal server client software on the client then establishes a terminal server connection using the parameters and ActiveX® functionality.

20 Claims, 7 Drawing Sheets

METHOD AND APPARATUS FOR TERMINAL SERVER ADDRESSABILITY VIA URL SPECIFICATION

TECHNICAL FIELD

The present invention relates generally to the field of computer-based methods and systems for facilitating terminal server access. More specifically, the present invention relates to the field of computer-based methods and systems for facilitating terminal server access using standard World Wide Web protocols and constructs.

BACKGROUND OF THE INVENTION

The use of remote terminal servers to view data and execute remote applications from connected local nodes has had a significant following, particularly in the business sector and amongst enterprises, for many years. In particular, because terminal server connections allow remote nodes to view the results of applications that are actually executed exclusively on a server, actual processing capability of the local nodes may be minimal. Thus, by limiting primary responsibility for processing to a single machine with extensive computing capability, computing power is maximized for a greater number of users at minimal expense.

Despite the advantages terminal servers afford, the use of such connections is also typically associated with certain downsides. In particular, terminal server connections usually involve access to interfaces and protocols and parameters that are proprietary or specific to a given terminal server package. As a result, extra time and expense is necessarily incurred by an enterprise that uses such connections in parallel with the more popular, standardized and flexible web-based protocols for inter-network and intra-network access.

As result, various attempts have been made to develop products allowing users at clients with standard, web-based browsers to access and make use of terminal server connections. The client functionality incorporated in the Metaframe program developed by Citrix Corporation is an example of such a product.

These software programs allow a web client to establish a terminal server connection using various methods. In one method for allowing web-client access to terminal servers, known in the prior art, a web page designer first creates a group of web pages at a web server. Each such page contains information including all the parameters necessary for a corresponding terminal server connection. A user can then click a URL via the browser to retrieve the page corresponding to a selected terminal server connection. Finally, terminal server client software on the client can then use the information in the retrieved page to create the selected terminal server connection.

The advantage of this method is that a standardized URL can be used to specify a terminal connection in its entirety, thus allowing the user to benefit from the flexibility and convenience associated with the ongoing integration of URL functionality into numerous applications (e.g., point and click convenience in e-mail applications).

Unfortunately, this method is also associated with a disadvantage. In particular, it requires the web page author to code terminal server information into a separate HTML page for each web-accessible terminal server connection.

In another method for allowing web-client access to terminal servers, the web page developer provides a set of web page interfaces, which the user can retrieve and use to specify the terminal server connection, including each connection parameter, locally. Once specified by the user, terminal server client software on the client can then use the information specified to create the selected terminal server connection. The advantage of this method is that the web page author is not required to code terminal server information into a separate HTML page for each existing web-accessible terminal sever connections.

Unfortunately, because a URL is not used to specify the connection, the flexibility and convenience of using a standardized addressing protocol, described above, are missing.

Therefore, what is needed is a way for allowing web-client access to terminal servers, using the flexibility and convenience of URL's, but without requiring extensive web page coding by a web page author.

SUMMARY OF THE INVENTION

The present invention satisfies this need. In particular, the present invention does so by incorporating the parameters necessary to establish a terminal server connection in the URL address of a web page designed to facilitate the connection. For example, a user at a client may specify a URL including certain parameters necessary to establish a corresponding terminal server connection. The standard http request generated by the URL is sent to the web server, which in response generates the complete set of parameters required for the terminal server connection using a script or other program logic. The full set of parameters may include: name of server, screen resolution or aspect ratio, name of application to execute (e.g., Word, SAP), audio (yes/no), login name, password, disk space for temporary storage, etc. The parameters are returned within the structure of a URL address corresponding to a web page having functionality used to facilitate the desired terminal server connection. Thus, the terminal server client software on the client can then use the information and parameters returned to create the selected terminal server connection. Perhaps more importantly, the user can re-establish the connection at a later time by merely specifying the returned URL.

Thus, the user has the option of establishing a terminal services connection by clicking a URL. Further, rather than code a web page with associated parameters for each existing terminal server connection, a web page author or web server administrator need only create a URL for each existing connection.

Further benefits of the present invention are made clear from the detailed description below.

DETAILED DESCRIPTION OF THE INVENTION

Overview

The present invention provides a means for facilitating terminal server access via specification of a URL. Further, the parameters required to complete terminal server connection are incorporated in the URL itself. Although the invention is described with respect to specific computing implementations, the scope of the present invention is by no means limited to those contexts.

Exemplary Operating Environment

Figure 1:
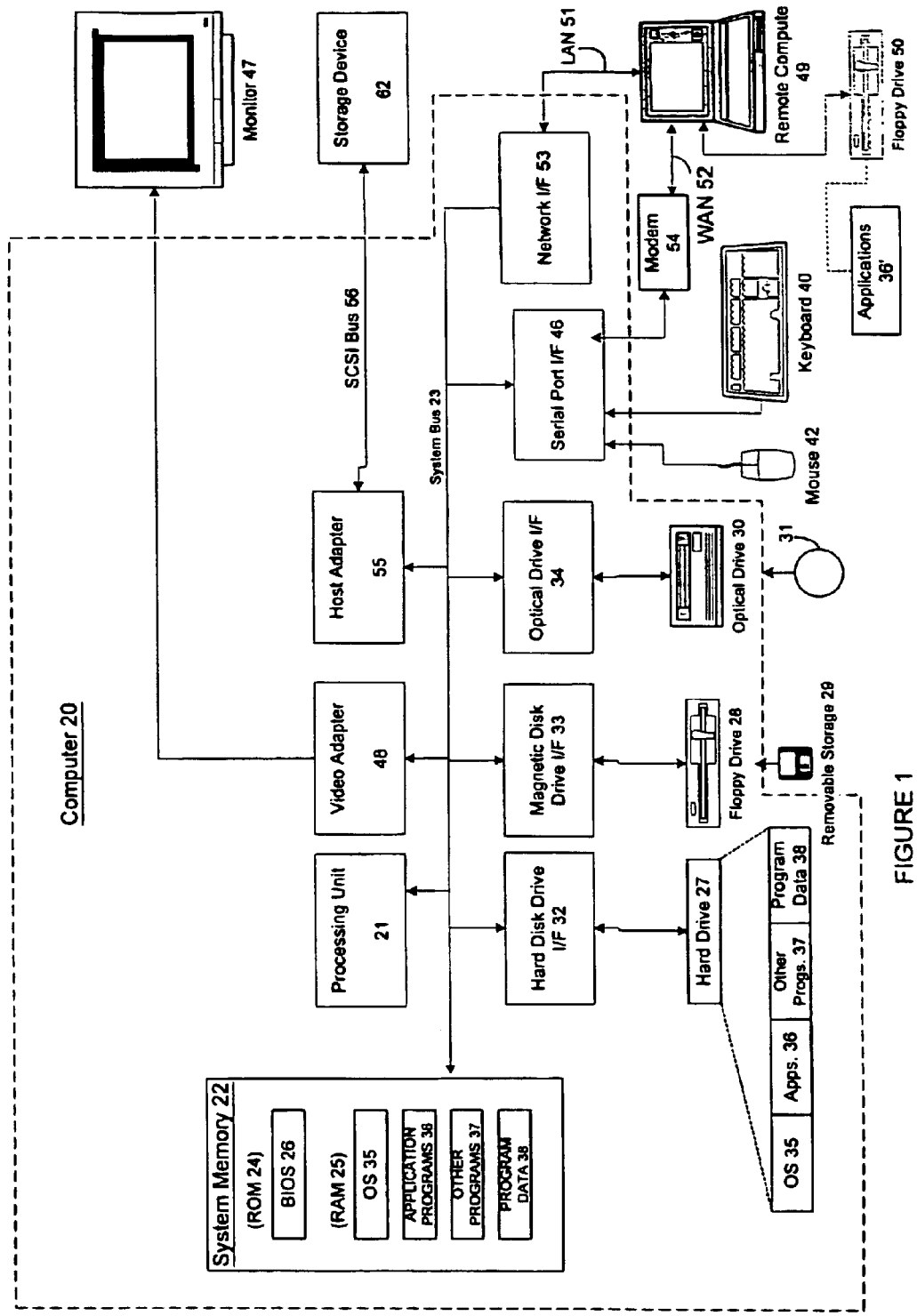
FIG. 1 is a block diagram representing a computer system in which aspects of the present invention may be incorporated.

FIG. 1 and the following discussion are intended to provide a brief general description of a suitable computing environment in which the invention may be implemented. The invention will be described in the general context of computer-executable instructions, such as program modules, being executed by a computer, such as a client work station, a web server or a terminal server.

Generally, program modules include routines, programs, objects, components, data structures and the like that perform particular tasks or implement particular abstract data types. Moreover, those skilled in the art will appreciate that the invention may be practiced with other computer system configurations, including hand held devices, multi-processor systems, microprocessor-based or programmable consumer electronics, network PCs, minicomputers, mainframe computers and the like. The invention is also preferably practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment. Further, as used herein, the term "computer readable medium" includes one or more instances of a media type (e.g., one or more floppy disks, one or more CD-ROMs, etc.).

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. A monitor 47 or other type of display device is also connected to the system bus 23 via an interface, such as a video adapter 48. In addition to the monitor 47, personal computers typically include other peripheral output devices (not shown), such as speakers and printers.

A personal computer 20 may operate in a networked environment using logical connections to one or more remote computers, such as a remote computer 49. The remote computer 49 may be another personal computer, a server, a router, a network PC, a peer device or other common network node, a web server or a terminal server, and typically includes many or all of the elements described above relative to the personal computer 20, although only a storage device 50 has been illustrated in FIG. 1. The logical connections depicted in FIG. 1 include a local area network (LAN) 51 and a wide area network (WAN) 52. Such networking environments are commonplace in offices, enterprise wide computer networks, Intranets and the Internet. When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the embodiment of the present invention wherein the WAN is the Internet, various protocols may be used to exchange commands and data between computers connected in the WAN. The protocols include the File Transfer Protocol (FTP), the Hyper Text Transfer Protocol (HTTP), the Simple Mail Transfer Protocol (SMTP), and the Gopher document protocol. The HTTP protocol is used to access data on the World Wide Web, often referred to as the Web. The Web is an information service on the Internet providing documents and links between documents. It is made up of numerous Web sites located around the world that maintain and distribute electronic documents. A Web site may use one or more Web server 49 computers that store and distribute documents in a number of formats, including the Hyper Text Markup Language (HTML). An HTML document contains text and metadata (commands providing formatting information), as well as embedded links that reference other data or documents by specifying Uniform Resource Locator's (URL's). The referenced documents may represent text, graphics, or video.

Sample Terminal Server Connection Session

Figure 2:
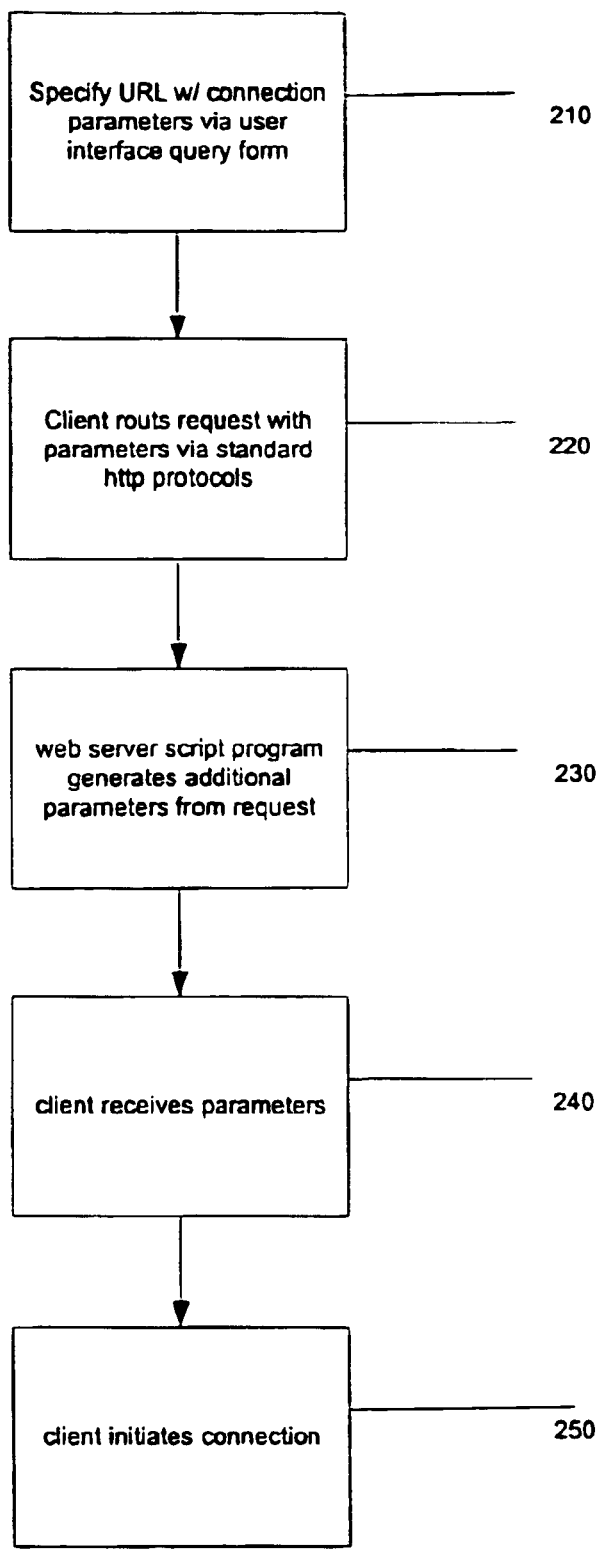
FIG. 2 is a high level flow chart depicting a method for establishing a terminal server connection in accordance with an embodiment of the present invention.

Turning now to FIG. 2, it is a high level flow chart depicting a method for establishing a terminal server connection in accordance with an embodiment of the present invention. In this presently described embodiment, the invention is practiced in a network having nodes communicating using http web protocols. A user operates a client computer 20 having browser software that sends requests to a server computer 49 having standard http protocol capability. The browser software may be, for example, Internet Explorer from Microsoft® Corporation or Netscape Navigator from Netscape Corporation. The server 49 returns response information in the form of http packets to the client 20.

Thus in Step 210, the user at client station 20 generates a request to the server 49 for a web page consisting HTML data representing a query form. Query forms allow web clients to specify and send information to web servers 49 apart from mere requests for particular web pages, and are well known in the art. In the presently described embodiment, the request is generated by an Internet Explorer browser by Microsoft® Corporation. In addition, the Internet Explorer application may be conveniently accessed via other software, such as the operating system 35 executing on the client 20 processor(s) 21. The operating system in the presently described embodiment is Microsoft® Corporation's Windows® 2000 operating system.

Figure 3:
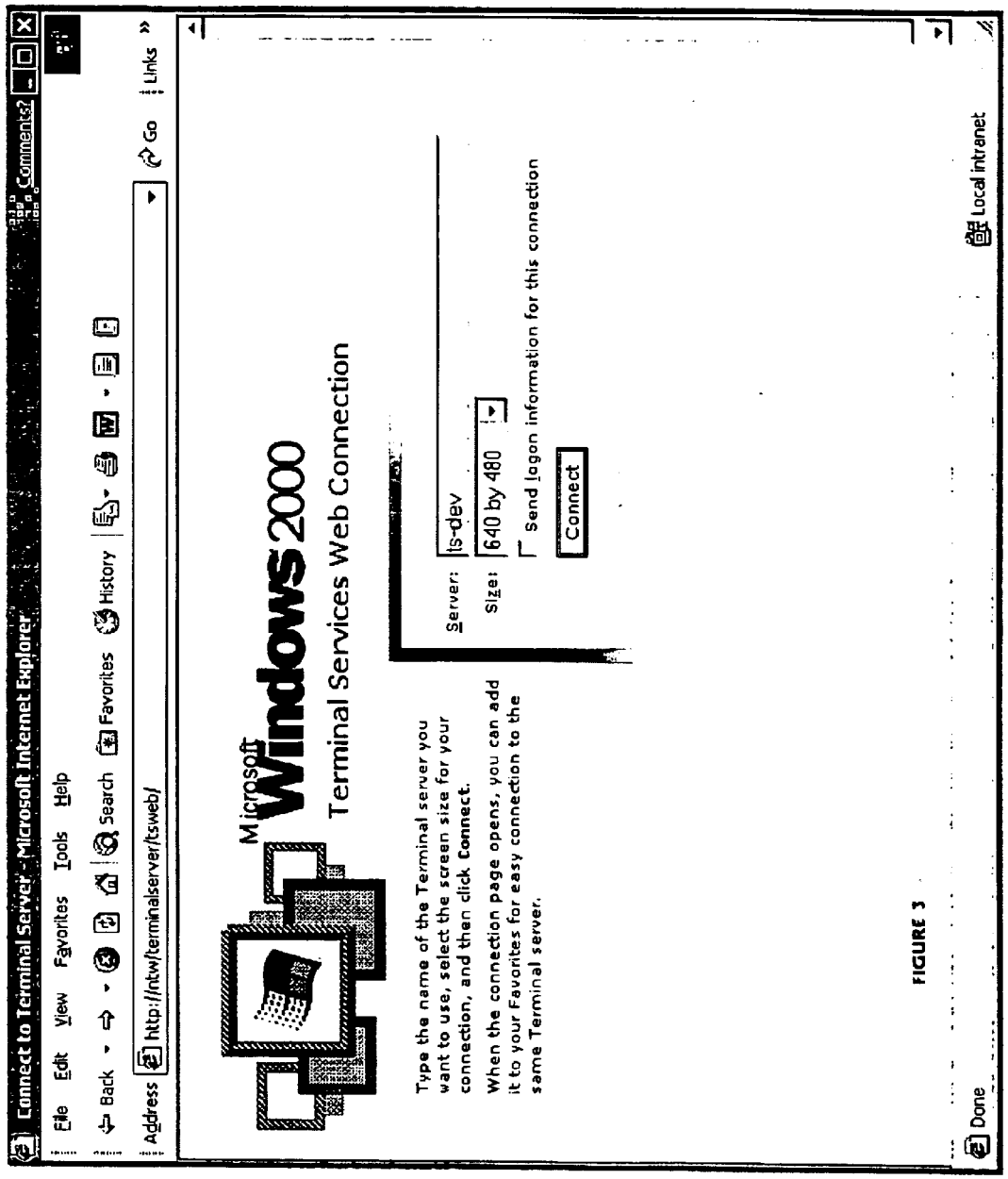
FIGS. 3, 4 and 5 depict web page screens that a user may utilize to specify a terminal server connection in accordance with an embodiment of the present invention.

Upon receiving the request, the web server 49 returns standard http packets, of the type known in the prior art, consisting of HTML data representing the requested query form. The client 20 browser can then interpret the HTML data for screen 47 display in a manner known in the prior art. FIG. 3 depicts the resulting web page query form generated at the client 20 in the presently described embodiment.

The query forms allow the user to enter information in a conventional manner using a keyboard 40 or mouse 42. This particular form is an initial page in a series of forms allowing a user to specify the parameters necessary to establish a particular terminal server connection. Note, however, that query forms and user interfaces are not strictly necessary to specify the parameters. For example, in accordance with the present invention, all terminal server connection parameters could be indicated by simply specifying a URL with parameters incorporated, without intermediate steps.

In the presently described embodiment however, in FIG. 3, the user is first asked to specify a screen size and terminal server parameters via, for example, the client 20 keyboard 40. The terminal server name parameter identifies the terminal server having the desired application for which an execution is desired. The screen size parameter delimits the size the client monitor 47 screen through which the user will view execution of the desired application running on the terminal server computer. In the screen depicted in FIG. 3, the ts-dev server is selected and a window size of 640 pixels by 480 pixels is also specified.

In Step 220, the user selects the connect button displayed in FIG. 3 and, in response, the client 20 browser generates a URL that, in conventional fashion, includes the parameters specified in the query form (i.e., the terminal server name and screen size parameters). This data is included in the structure of the URL in accordance with conventional standards regarding syntax of URL incorporated parameters.

Also in conventional fashion, the browser causes the URL to be translated into a unique network IP address of a desired web page and then generates a request for that web page. In the presently described embodiment, the requested web page corresponds to terminal server screen prompts allowing a user to specify further terminal server connection parameters.

Figure 4:
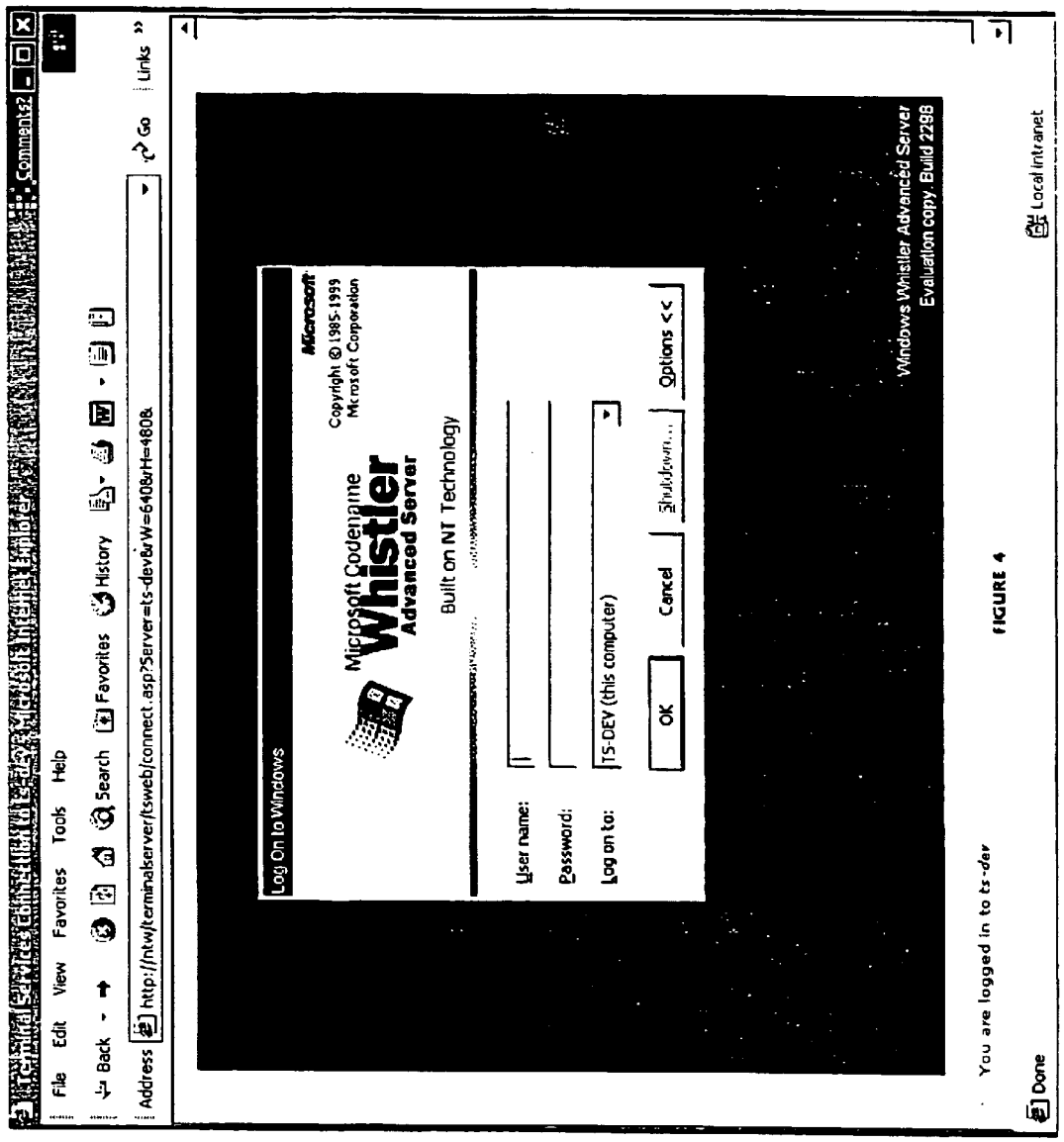

Again, the request is routed to the web server 49 using standard http protocols. The web server 49 locates the requested page, using the unique network address and parameters, and routes the page back to the client 20. As noted above, in the presently described embodiment, the web page has screen prompts depicted in FIG. 4 allowing a user to specify authentication parameters to complete a connection to the terminal server earlier specified by name (i.e., ts-dev). Also, in accordance with the invention, as depicted in FIG. 4, the URL corresponding to this web page incorporates the earlier specified terminal server name and screen size parameters.

The user at the client 20 can again use the keyboard 40 to specify user name and password parameters in the prompts indicated. Once the information is entered, the user can select the depicted OK button to request that the terminal server connection be completed.

In Step 230 of FIG. 2, the web server receives the user request, including translated URL with password and user name parameters required to complete the desired terminal server connection.

Figure 5:
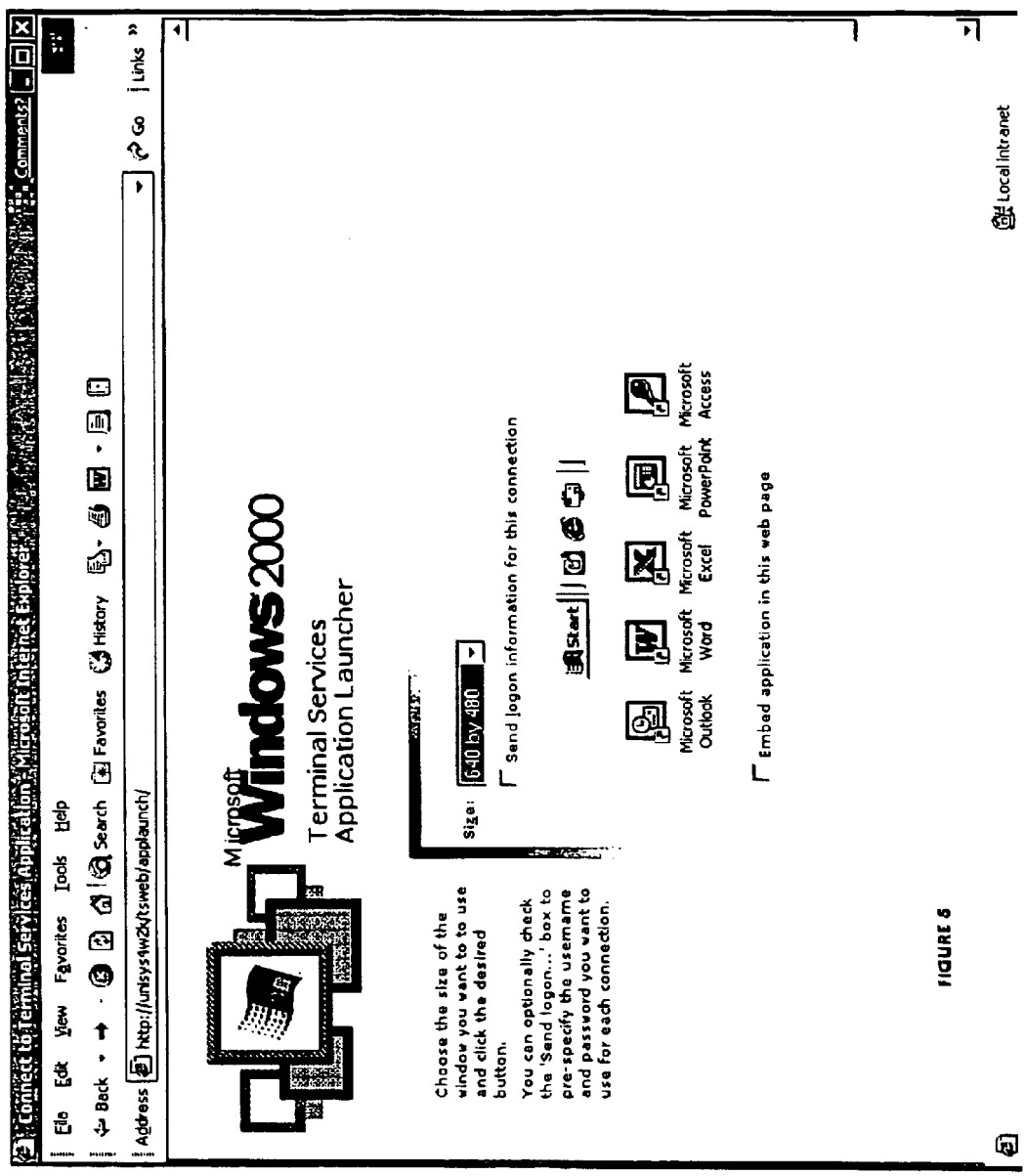

In response, in a manner similar to that described above, a new web page is returned allowing specification of a parameter indicating the application to be executed on the earlier selected terminal server. FIG. 5 depicts a sample Application Launching query form page allowing a user to specify a particular Microsoft® Corporation software application for execution. Upon selection of an application button depicted by the user at the client 20, an http request and the application identifier parameter is sent to the web server 49 as described above.

In accordance with the present invention, the web server incorporates Advanced Server Pages (ASP), Common Gateway Interface (CGI) or other conventional scripting software functionality. At this point, in the presently described embodiment, the web server 49 uses an ASP script that utilizes the user specified parameters to generate any additional parameters required to complete the desired terminal server connection. The additional parameters generated may include: the screen resolution or aspect ratio, the name of application to start (e.g., Word, SAP), whether executing the application requires audio sound, the amount of disk space for temporary storage, etc. In the presently described embodiment, at a minimum, the ASP script generates the directory location on the terminal server having the application selected. Once all parameters are generated, a web page is returned to the client with corresponding URL address having the required parameters.

Thus, in Step 240, the client receives the complete set of parameters required to facilitate terminal service connection. In accordance with an embodiment of the present invention, the parameters are received with a web page and associated ActiveX® controls or other embedded program having functionality beyond that of traditional HTML. ActiveX® control, by Microsoft® Corporation, can be inserted into Web pages, spread sheets, word documents, etc. In the presently described embodiment the ActiveX® controls function to establish a terminal server connection with the desired terminal server and client 20 using the parameters earlier specified by the user and generated at the web server 49. Preferably, the ActiveX® controls are written so as to establish a terminal server connection with any terminal server, regardless of platform or communication protocols required, once the necessary parameters are specified. To execute the ActiveX® controls, the client 20 browser is ActiveX® enhanced.

In Step 250, the client 20 initiates the terminal service connection with the terminal server via execution of ActiveX® controls, using whatever proprietary protocols are necessary to do so. In one embodiment of the present invention, the terminal server box is running Microsoft® Corporation IIS, thus allowing the terminal server to be one in the same as the web server 49. Thus, the terminal server connection is established with the web server 49.

Figure 7:
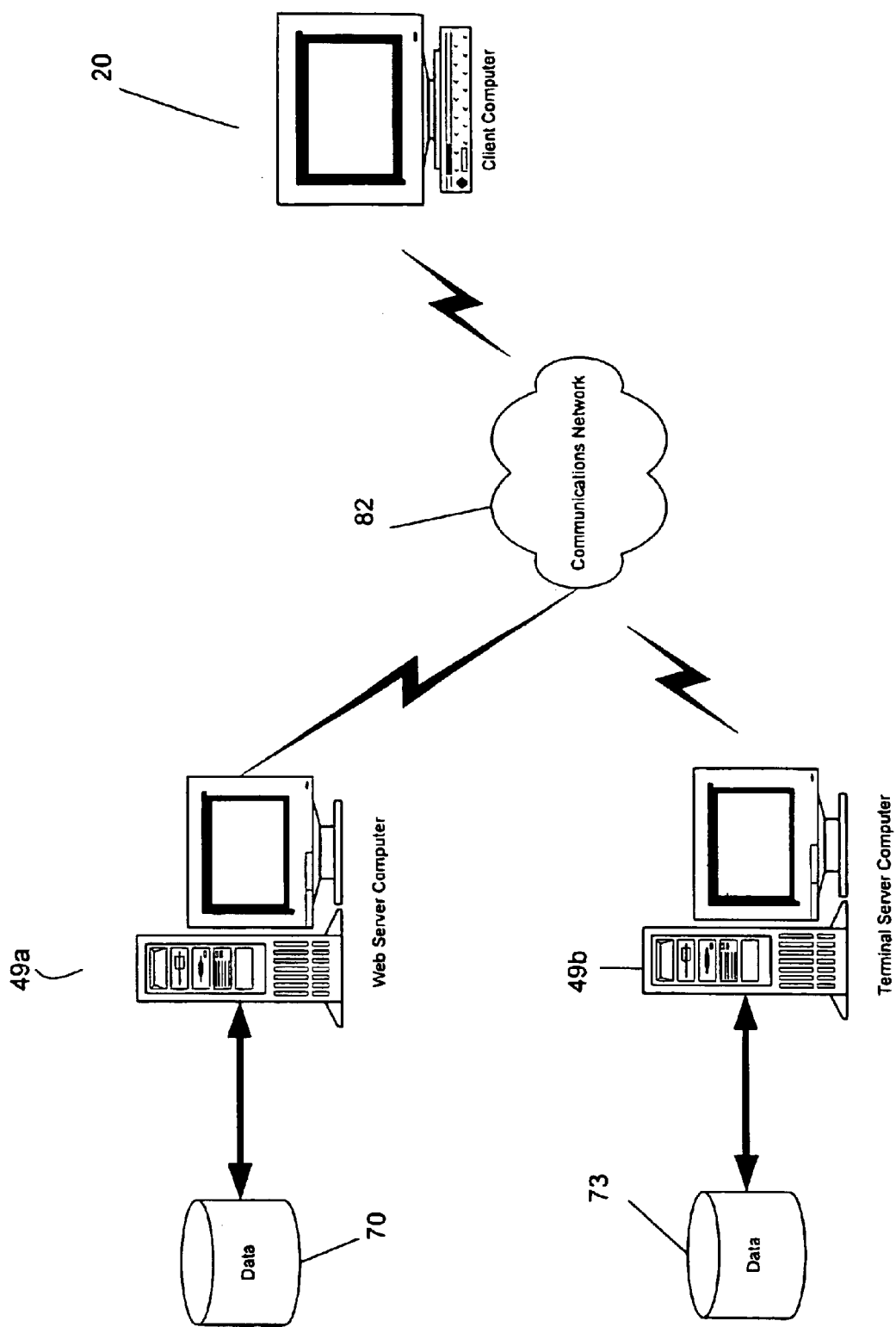
FIG. 7 is a high level view of a network environment in which an embodiment of the present invention may be implemented.

In the presently described embodiment however, as depicted in FIG. 7, the terminal server 49b is located remotely from the web server 49a and client 20. Thus, the client 20 receives the parameters and ActiveX® controls from one location and uses that data and functionality to establish a connection with a terminal server at another location.

Upon completion of the connection with the terminal server 49b using required parameters, the terminal server executes the selected application. The terminal server 49b also returns to the client 20 a display showing execution of the application on the terminal server 49b. The display is shown in a screen window sized according to the user's earlier specified parameters. The window itself is within the browser interface on the client 20 screen, as the browser continues running on the client 20 throughout the above-described process.

Figure 6:
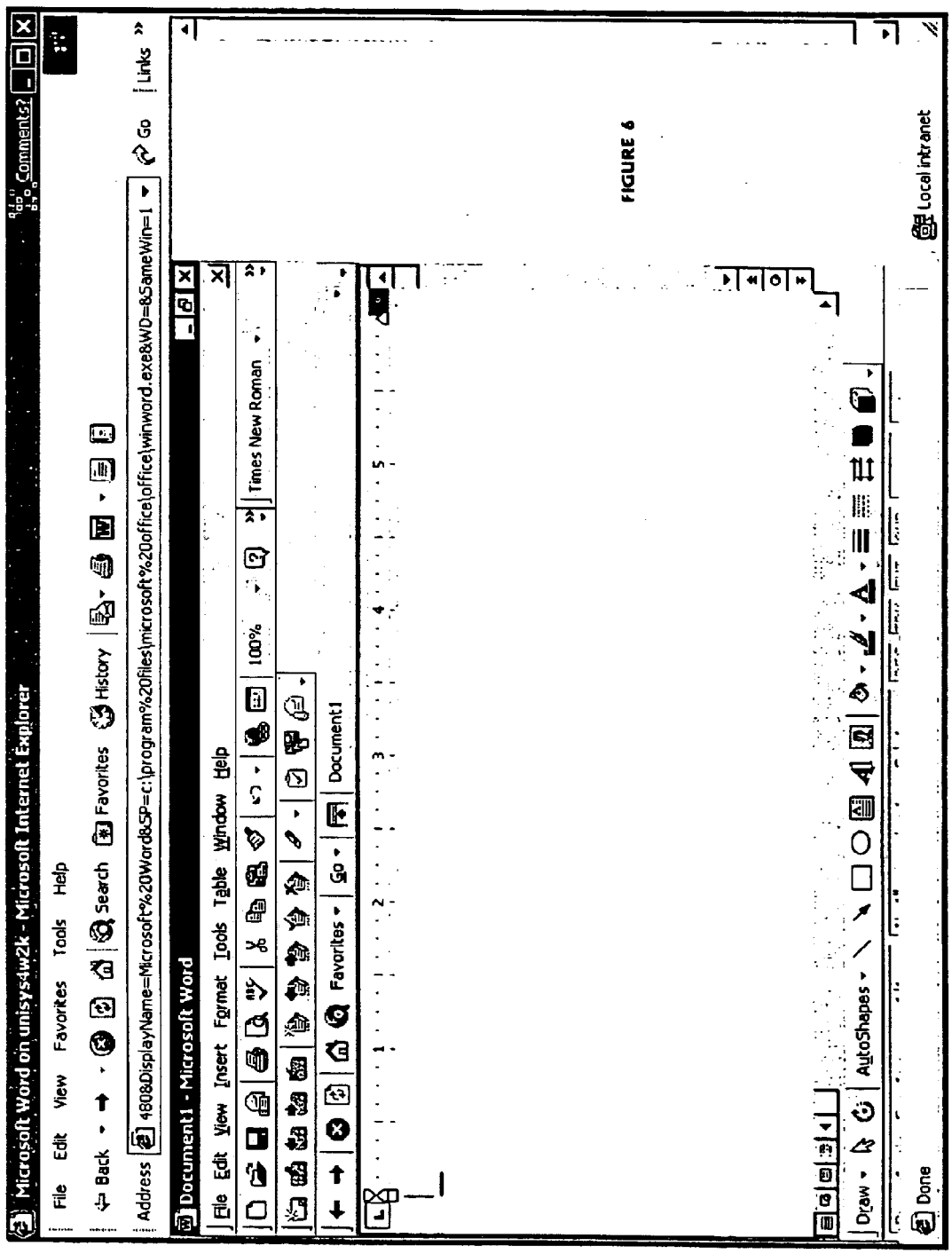
FIG. 6 depicts a web page screen presented upon completion of a terminal server connection in accordance with an embodiment of the present invention, and illustrates the incorporation of terminal service connection parameters in the URL of the corresponding web page data.

For example, FIG. 6 shows within Internet Explorer® browser interface a selected Microsoft® Word application running on the "ts-dev" terminal sever. In the browser address field, a URL is shown corresponding to the web page that was returned from the web server 49a to facilitate this connection with terminal server 49b. In accordance with the invention, the URL includes the full address and parameters required for ActiveX® controls to make the desired terminal server connection. These parameters include the word application selected as well as its directory location on the terminal server 49b.

Because the URL includes all the parameters necessary to re-establish the terminal server connection, a users or site administrators enjoy certain benefits. For instance, the URL depicted in the address prompt area of FIG. 6, like any URL, may be e-mailed to the user or stored in the "Favorites" folder associated with the client 20 browser. Once so obtained at the client 20, the user can at any time re-establish the same terminal server connection by clicking the URL in conventional fashion. In particular, the URL selection causes the client 20 browser to obtain a web page with ActiveX® controls from the web server 49a. Once the web page is obtained, the URL-incorporated parameters and embedded ActiveX® controls are used to re-establish the terminal server connection.

Thus, the present invention provides benefits to users and administrators by storing the information required for a terminal server connection in a URL address, the address also corresponds to a web page having functionality required to execute the terminal server connection. While the invention has been described above in detail and with reference to specific embodiments thereof, it will be apparent to one skilled in the art that various changes and modifications can be made therein without departing from the spirit and scope thereof. Therefore, the scope of the invention should be understood with reference to the following claims.

What is claimed is:

1. A method for establishing a terminal server connection with a terminal server using a web browser executing at a client station, the method comprising:
   a. the browser generating a request at the client station by specifying a URL in response to a user input, the user input corresponding to the terminal server connection, the URL having a first set of parameters necessary to complete the terminal server connection;
   b. receiving web page data corresponding to the specified URL, the web page data including a second set of parameters necessary to complete the terminal server connection; and
   c. establishing the connection with the terminal server using the first and second set of parameters.

2. The method of claim 1 wherein the browser request conforms to TCP/IP protocols.

3. The method of claim 2 wherein the browser request conforms to http protocols.

4. The method of claim 1 wherein the parameters include an identifier identifying the terminal server.

5. The method of claim 4 wherein the parameters include an identifier identifying an application residing on the terminal server.

6. The method of claim 5 wherein the web page data includes embedded software functionality for establishing a connection with the terminal server.

7. The method of claim 6 wherein the software functionality comprises ActiveX controls.

8. A client computer, the client computer generating requests to a server computer, the client computer comprising:
   a. a processor and associated memory,
   b. a browser software component comprising instructions residing in the memory capable of being executed by the processor, where, upon execution of the browser software component, the client generates a request to the server for a web page in response to a user input, the web page having a corresponding URL, the URL having parameters necessary to complete a terminal server connection; and
   c. a connection software component comprising instructions residing in the memory capable of being executed by the processor, where, upon execution of the connection software component, a connection with the terminal server is established using the parameters.

9. The client computer of claim 8 wherein the browser incorporates TCP/IP functionality.

10. The client computer of claim 9 wherein the browser incorporates http functionality.

11. The client computer of claim 8 wherein the parameters include an identifier identifying the terminal server.

12. The client computer of claim 11 wherein the parameters include an identifier identifying an application residing on the terminal server.

13. The client computer of claim 12 wherein the web page is associated with software functionality for facilitating the establishment of a connection with the terminal server and wherein the client also comprises a software component for executing said software functionality.

14. The client computer of claim 13 wherein the software functionality comprises ActiveX controls.

15. A server computer, the server computer generating responses in response to requests from a client computer, the server computer comprising:
   a. a processor and associated memory;
   b. a web software component comprising instructions residing in the memory capable of being executed by the processor, where, upon execution of the web server software component, the server generates a response to a request for web page data stored on the server computer received from the client computer, the request including a URL corresponding to the web page data, the URL including terminal server connection parameters; and c. a parameter determination component comprising instructions residing in the memory capable of being executed by the processor, where, upon execution of the parameter determination component, the server computer uses the terminal server connection parameters to generate a complete set of parameters required to establish a terminal server connection.

16. The server computer of claim 15 wherein the parameters include an identifier identifying the terminal server.

17. The server computer of claim 16 wherein the parameters include an identifier identifying an application residing on the terminal server.

18. The server of claim 17 wherein the web page stored on the server computer is associated with a file resource comprising software for establishing a connection with a terminal server, such that when the web page is served to the client computer the file resource is also served.

19. The server computer of claim 18 wherein the software functionality comprises ActiveX software.

20. A computer-readable medium having computer-executable instructions for performing instructions comprising:

a. generating a request at a client station by specifying a URL in response to a user input, the user input corresponding to a desired terminal server connection, the URL having a first set of parameters necessary to complete the terminal server connection;

b. processing data corresponding to the specified URL in response to receipt of said data corresponding to the specified URL, the data including a second set of parameters necessary to complete the terminal server connection; and c. establishing the connection with the terminal server using the first and second set of parameters.

* * * * *